(12) United States Patent
Gremaud (10) Patent No.: US 11,768,643 B2
(45) Date of Patent: Sep. 26, 2023

(54) SECURE DEVICE COMMUNICATION VIA CONSUMABLE COMPONENTS

(71) Applicant: NAGRAVISION S.A., Cheseaux-sur-Lausanne (CH)

(72) Inventor: Fabien Gremaud, Chatel-St-Denis (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 17/193,520

(22) Filed: Mar. 5, 2021

(65) Prior Publication Data
US 2022/0283759 A1    Sep. 8, 2022

(51) Int. Cl.
*G06F 21/64* (2013.01)
*G06F 21/60* (2013.01)
*G06F 3/12* (2006.01)

(52) U.S. Cl.
CPC .......... *G06F 3/1239* (2013.01); *G06F 3/1203* (2013.01); *G06F 3/123* (2013.01); *G06F 3/1221* (2013.01); *G06F 3/1236* (2013.01); *G06F 3/1292* (2013.01); *G06F 21/608* (2013.01); *G06F 21/64* (2013.01); *G06F 3/1219* (2013.01)

(58) Field of Classification Search
CPC .... G06F 3/1239; G06F 3/1203; G06F 3/1221; G06F 3/123; G06F 3/1236; G06F 3/1292; G06F 21/608; G06F 21/64; G06F 3/1219; G11B 23/285; G03G 2215/0097; G03G 21/1867; G03G 21/1875; G03G 2215/066; G03G 2215/0665; G03G 2215/0673; G03G 21/1814; G03G 21/1842
See application file for complete search history.

(56) References Cited

U.S. PATENT DOCUMENTS

| | | | | |
|---|---|---|---|---|
| 8,972,726 | B1* | 3/2015 | Poling | G06F 21/10 726/26 |
| 2011/0109938 | A1* | 5/2011 | Refstrup | G06F 21/608 358/1.15 |
| 2016/0082740 | A1* | 3/2016 | Jeran | G06F 21/608 358/1.14 |
| 2016/0187827 | A1* | 6/2016 | Jeran | G06F 21/73 399/12 |
| 2017/0208059 | A1* | 7/2017 | Shin | G06F 21/44 |
| 2017/0230540 | A1* | 8/2017 | Sasaki | G06F 21/44 |
| 2017/0249190 | A1* | 8/2017 | Dinca | G06F 3/1203 |

(Continued)

OTHER PUBLICATIONS

English Machine Translation of JP 2011-197766 A (Takatani, Published Oct. 6, 2011) (Year: 2011).*

*Primary Examiner* — Juan M Guillermety
(74) *Attorney, Agent, or Firm* — Oblon, McClelland, Maier & Neustadt, L.L.P.

(57) ABSTRACT

A consumable can be used to securely send data to devices. A security platform can produce a consumable, for example an ink cartridge, with data to be uploaded onto a device, such as a printer. If the consumable and device can perform a successful authentication, broadcast data can be delivered to the device via the consumable. Such techniques can help ensure that authentic consumables are being used in authentic devise. Further, such techniques can enable a licensing model where different consumables can be configured with different data to enable or disable different features of the device.

10 Claims, 9 Drawing Sheets

(56) References Cited

U.S. PATENT DOCUMENTS

2018/0022104 A1* 1/2018 Bonneton ............ G06F 21/608
　　　　　　　　　　　　　　　　　　　347/86
2020/0250322 A1* 8/2020 Sayers ................. G06F 21/608
2020/0314082 A1* 10/2020 Enomoto ............. G06F 3/1219

* cited by examiner

SECURE DEVICE COMMUNICATION VIA CONSUMABLE COMPONENTS

FIELD OF THE INVENTION

This present disclosure relates to securely communicating with devices via a consumable.

BACKGROUND

One way to communicate with a device is through a network connection. Uses of the network connection include delivering data, monitoring usage, or remotely operating the device. However, for devices that do not have a network connection, it can be difficult to perform the aforementioned tasks. As a result, these devices may be operated and used in unsafe or undesirable scenarios. Once the devices without network connections are deployed, the supplier may have no way to interact with the devices, and may not be able to perform actions such as fixing security patches, updating revocation lists (e.g. to revoke security credentials), performing remote maintenance and configurations, monitoring for security issues, and monitoring for predictive maintenance.

Furthermore, suppliers often rely on recurrent revenue from selling consumables used by the devices they supply. In the case of printers, printer suppliers rely on repeated purchases of new ink cartridges, or refilling used, authentic cartridges, for additional revenue. In this scenario the printer being the device (not connected to any type of network) and the ink cartridge being the consumable. Since ink cartridges can be easily cloned or replicated, printer suppliers need ways to determine whether cartridges installed in printers are authentic cartridges or clones.

In light of the above mentioned problems, there is a need for suppliers to be able to interact with devices they have sold, leased, or otherwise provided to an end user even if the devices are not connected to a network. There is also a need for printer suppliers to ensure that authentic ink cartridges are used in the devices.

SUMMARY

The present disclosure describes a method for securing a device comprising: loading, by a security system, data into a consumable, the data including security data and broadcast data; communicatively coupling the consumable to the device; performing an authentication between the consumable and the device using the security data in the consumable; and in a case that the authentication is successful, uploading the broadcast data from the consumable to the device.

One aspect of the present disclosure further comprises, in the case that the authentication is unsuccessful, disabling one or more features of at least one of the device and the consumable.

Another aspect of the present disclosure further comprises, uploading device data from the device to the consumable.

Another aspect of the present disclosure further comprises, directing the device, using the security data, to enable one or more features of the device.

Another aspect of the present disclosure further comprises, directing the device, using the security data, to disable one or more features of the device.

In another aspect of the present disclosure, the broadcast data includes software update data.

In another aspect of the present disclosure, the security data includes an authorization token.

In another aspect of the present disclosure, the consumable is a battery.

In another aspect of the present disclosure, the device is a printer.

In another aspect of the present disclosure, the security data includes a consumable revocation list.

The present disclosure also describes a consumable device comprising: circuitry configured to, store data, the data including security data and broadcast data; perform an authentication between the consumable and a device using the security data in the consumable when the consumable and the device are communicatively coupled together; and in a case that the authentication is successful, upload the broadcast data from the consumable to the device.

In another aspect of the present disclosure, the circuitry is further configured to, in the case that the authentication is unsuccessful, upload additional security data to the device to disable one or more features of at least one of the device and the consumable.

In another aspect of the present disclosure, the circuitry is further configured to, receive device data from the device.

In another aspect of the present disclosure, the circuitry is further configured to, direct the device, using the security data, to enable one or more features of the device.

In another aspect of the present disclosure, the circuitry is further configured to, direct the device, using the security data, to disable one or more features of the device.

In another aspect of the present disclosure, the broadcast data includes software update data.

In another aspect of the present disclosure, the security data includes an authorization token.

In another aspect of the present disclosure, the consumable is a battery.

In another aspect of the present disclosure, the device is a printer.

In another aspect of the present disclosure, the security data includes a consumable revocation list.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

This disclosure is directed to a system and method for using consumables to deliver information to and from devices. For simplicity and brevity, the example of an ink cartridge (consumable) and a printer (device) are used to explain some of the embodiments. However, one of ordinary skill in the art will recognize that the techniques mentioned herein can be applied to other devices that use consumables. For example, batteries may be used to deliver information to and from a battery powered device, or light bulbs may be used to deliver information to and from a lighting system.

Figure 1:
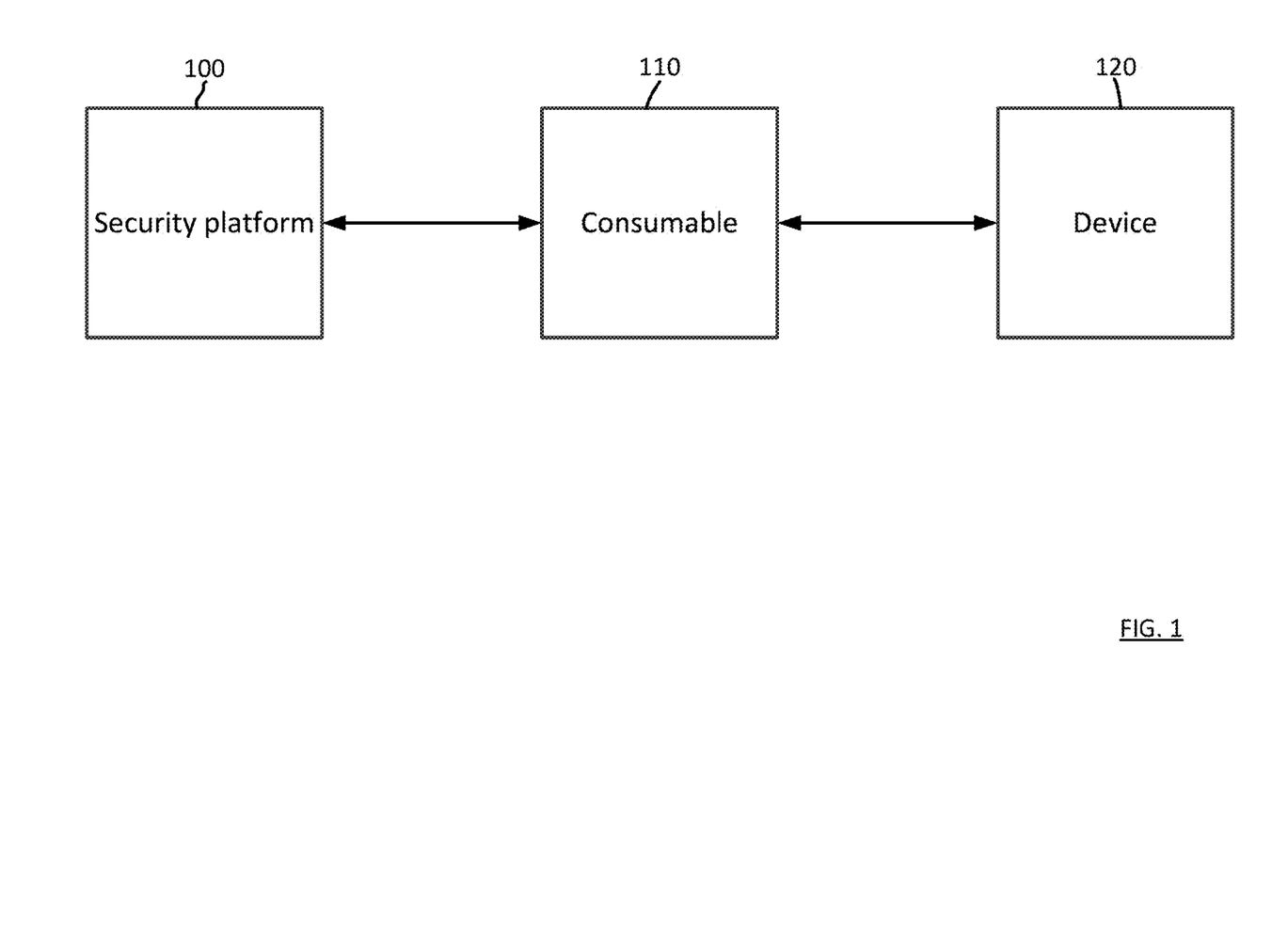
FIG. 1 is a block diagram of a security platform for device information exchange via a consumable according to aspects of the present disclosure.

Referring now to the drawings, FIG. 1 is a high level overview of a security platform 100, consumable 110, and device 120 according to some embodiments. The security platform 100 can generate and upload data that is to be delivered to the device 120 onto the consumable 110, such as security data and broadcast data. In another embodiment, the security platform 100 can be located at and operated by an authorized vendor of the consumable 110. Then, the consumable 110 can be attached to the device 120. Once attached, the data within the consumable can be delivered to the device 120 by the consumable 110. The device 120 can also upload device data onto the consumable 110, such as field data. When the consumable 110 is returned to the security platform 100, this device data uploaded onto the consumable 110 from the device 120 can be stored and processed by the security platform 100.

Using the example of an ink cartridge and a printer, an authorized vendor of the ink cartridge can upload data onto the ink cartridge. When the ink cartridge is installed in the printer, the ink cartridge can deliver data to the printer, and the printer can upload data to the ink cartridge. Once depleted, the ink cartridge can be returned to the authorized vendor (e.g. for recycling or refilling), where device data delivered from the printer to the ink cartridge can be collected and analyzed by the authorized vendor.

The described embodiment advantageously allows data to be delivered to devices without a network connection. Security data can also be used between the consumable and device to perform an authentication, ensuring that authentic, authorized consumables are used in the device. A licensing model is also provided, where consumables are able to enable or disable one or more features of the device. For example, depending on the consumable that the user acquires, different data can be uploaded onto the device to enable or disable different features. As one implementation, a subcontractor can order one or more licenses, and the security platform 100 can deliver or update a license dongle with the ordered licenses onto each consumable 110. Using the example of an ink cartridge and a printer, data can be uploaded onto the ink cartridge to enable or disable high resolution printing depending on the license acquired by the user.

Figure 2:
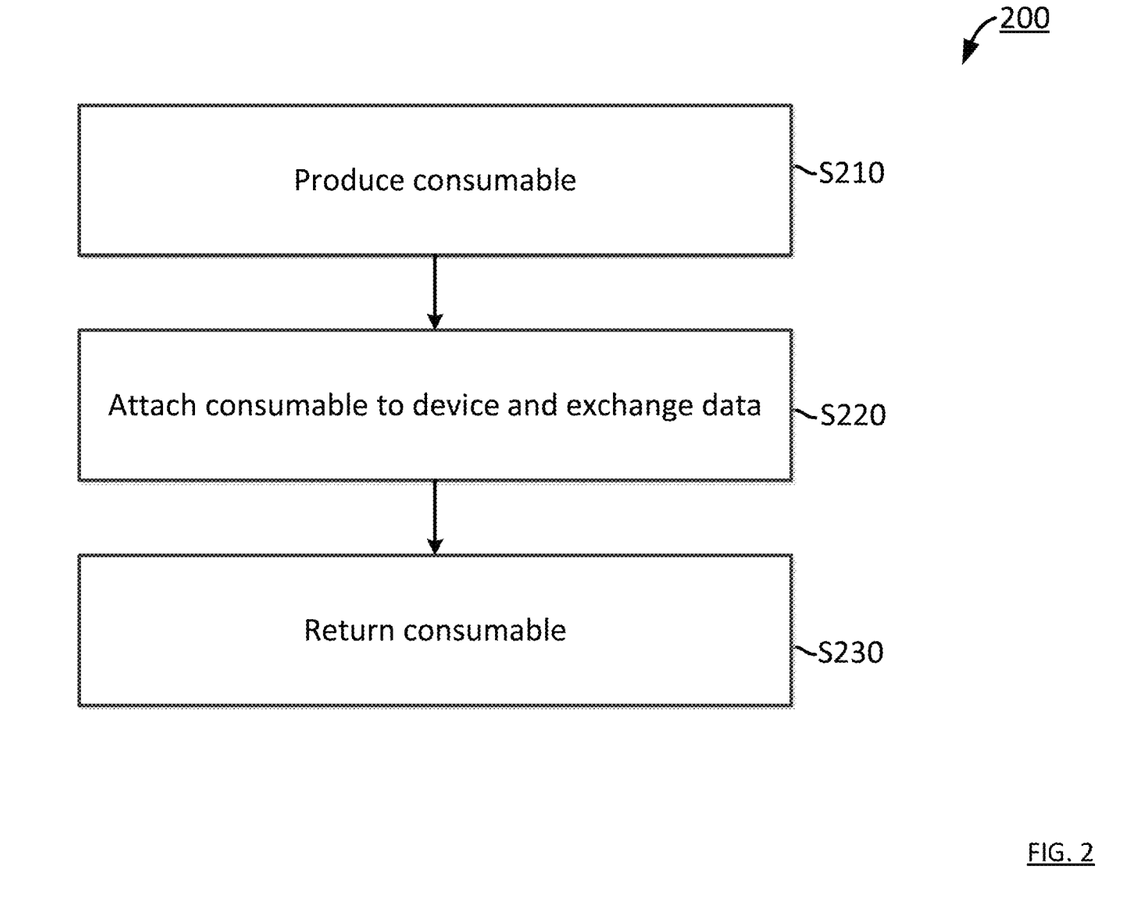
FIG. 2 is an algorithmic flowchart of producing and using a consumable for securely exchanging data according to aspects of the present disclosure.

FIG. 2 is a method 200 for delivering data using consumables according to an embodiment. At step S210, a consumable, such as consumable 110, is produced. This includes configuring the consumable 110 with data, such as broadcast data and security data to be delivered to a device, such as device 120, by a security platform, such as security platform 100. At step S220, the consumable 110 is attached to the device and the consumable 110 exchanges data with the device 120. This exchanging includes the consumable 110 delivering the broadcast data and security data to the device 120, as well as the device 120 delivering device data to the consumable 110. At step S230 the consumable 110 is returned. The consumable 110 is returned to the security platform 100 for analyzing the device data, recycling the consumable 110, or replenishing the consumable 110. As one of ordinary skill will recognize, the consumable 110 does not have to be returned, such that the communication of information is one-way, without departing from the scope of the present disclosure.

Figure 3:
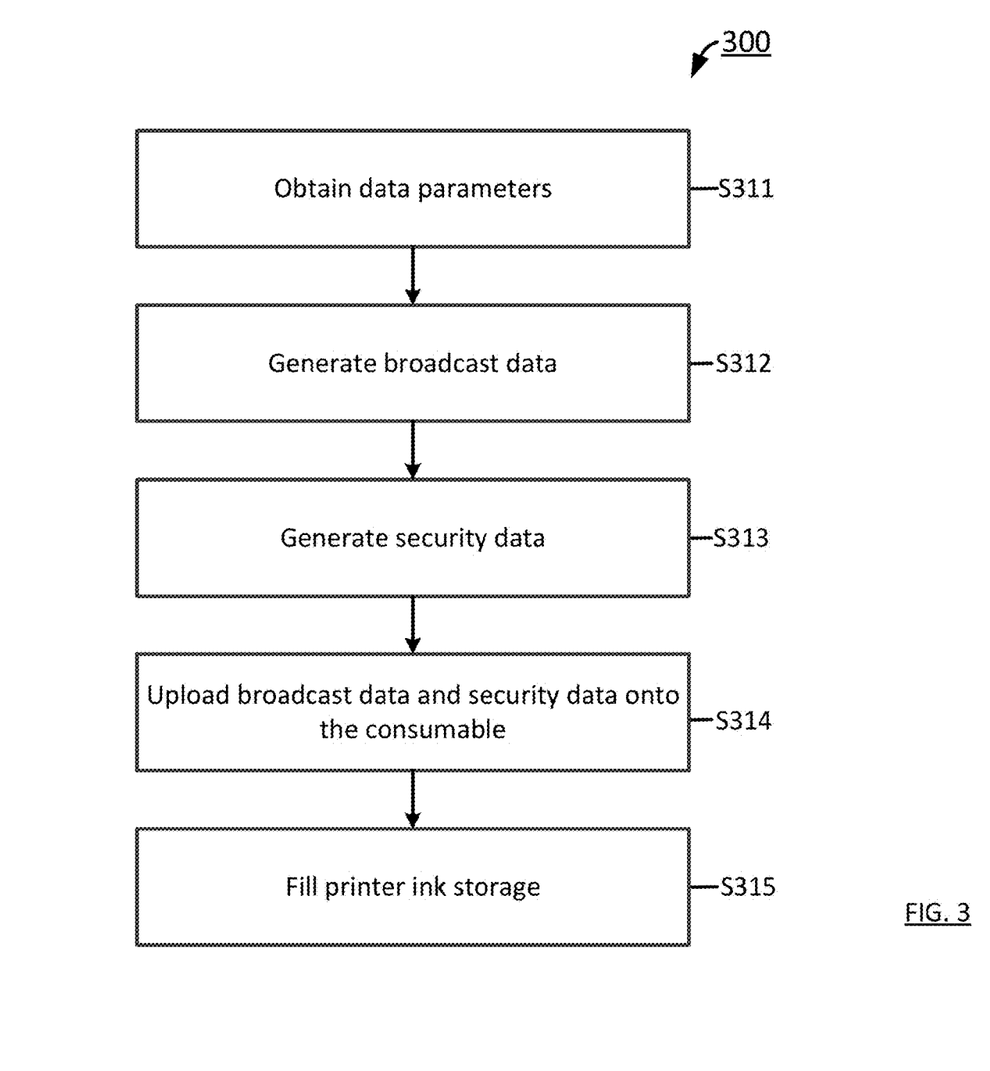
FIG. 3 is an algorithmic flowchart of producing a consumable according to aspects of the present disclosure.

FIG. 3 is a method 300 for an embodiment of producing a consumable 110 as mentioned in S210. The method 300 begins in S311 by obtaining data parameters. The data parameters are used to determine what data to configure onto the consumable 110 (and ultimately be delivered to the device 120). For example, if the consumable 110 is an ink cartridge, data parameters to be obtained can include the requested ink color, number of ink cartridges to be purchased, the device 120 model, and the features they'd like to unlock on the device 120.

The next step S312 is generating broadcast data using the data parameters obtained in S311. This broadcast data can include the data that is to be delivered to the device 120, such as software update data (e.g. a list to revoke specific consumable id or range, a critical firmware fix to be installed, a specific counter measure to be executed, a specific configuration data to be applied, a predictive maintenance to be done).

The next step S313 is generating security data. The security data is used to ensure that a legitimate consumable 110 is being attached to a legitimate device 120. This security data includes data to perform an authentication between the consumable and the device, such as an authorization token. For example, the consumable 110 can be programmed with an authorization token bound to its secret identity and generated by the security platform 100, such as an oAuth token signed with a secret asymmetric key only known into a security platform hardware security module (HSM). oAuth (e.g. oAuth 2.0) is an authorization protocol that enables secure designated access by using authorization tokens to provide an identity between the consumable 110 and the device 120. The authorization token can also have time validity information, such as a start of validity time in an acceptable range.

Furthermore, the security data also includes information to authorize usage of specific device 120 features or forbid usage of specific device features. For example, a consumable that a user paid a higher price for can have security data that unlocks all the features of a device 120, whereas a consumable 110 that a user paid a lower price for can unlock less than all the features of a device 120. Note that in other embodiments, S313 can be performed before S312, or at the same time as S312.

Moreover, the security data can also include a consumable revocation list (CRL), such as a public key infrastructure (PKI) certificate revocation list, of consumables 110 that are revoked (i.e. cannot have full access to the device 120). The CRL can be fully or incrementally updated into the device 120 using one or more consumables 110, where the CRL is then used to blacklist and revoke suspicious consumables 110.

The next step S314 is uploading the broadcast data from S312 and security data from S313 onto one or more consumables 110. The data is uploaded onto a secure element housed in the consumable 110. In one embodiment, all the data is uploaded onto a single consumable 110. In another embodiment, the data can be split up and distributed across a plurality of consumables 110 for delivering data all at once, or delivering data over time. For delivering data all at once, because some devices 120, such as printers, accept multiple consumables 110 at a time (e.g. ink cartridge with black ink, ink cartridge with yellow ink, ink cartridge with cyan ink, and ink cartridge with magenta ink), some of the data is split up across the multiple consumables 110. For delivering data over time, additional data is uploaded onto the consumable 110 from the security platform 100, replacing some of the previously uploaded data, each time the consumable 110 is replenished. Each time the replenished consumable 110 is reinstalled into a device 120, additional data is delivered. The data is self-contained so that the device 120 can function even though it does not have all the data.

In step S315, the consumable 110 is filled. For example, if the consumable 110 is an ink cartridge, the ink cartridge is be filled with ink. After filling, the consumable is given to a user for use in the field (e.g. home, office, library).

Figure 4:
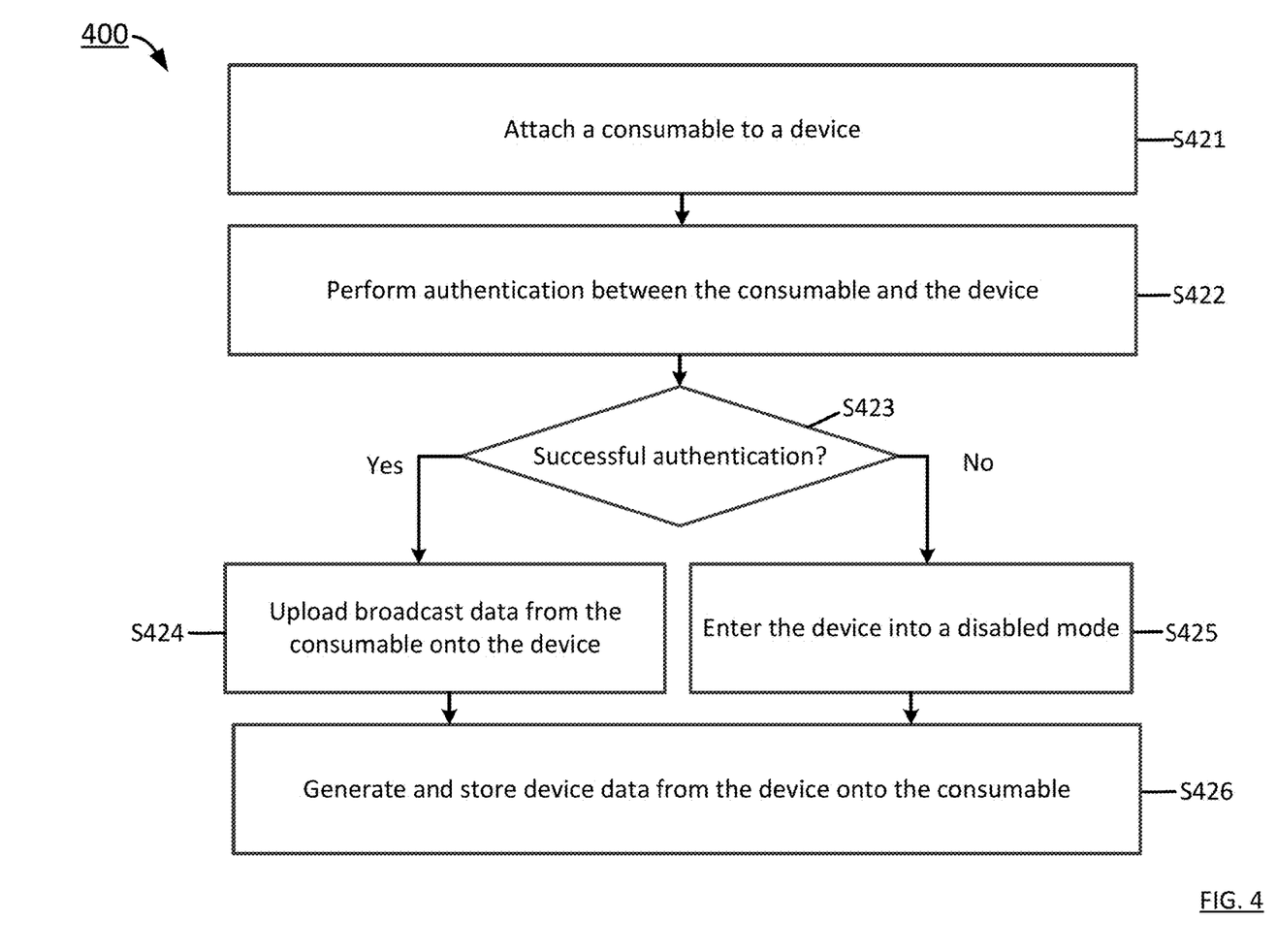
FIG. 4 is an algorithmic flowchart of attaching a consumable to a device for exchanging data between the consumable and the device according to aspects of the present disclosure.

FIG. 4 is a method 400 for one embodiment of attaching the consumable 110 to the device 120 and exchanging data as mentioned in S220. The first step S421 is attaching the consumable 110 produced in method 300 onto a device 120. For example, an ink cartridge can be installed onto a printer.

The next step S422 is performing an authentication between the consumable 110 and the device 120, using the security data, to verify legitimacy. The authentication can look like authentication of the consumable 110 by the device 120, authentication of the device 120 by the consumable 110, or a mutual authentication between both the consumable 110 and the device 120. For instance, in the case that the device 120 authenticates the consumable 110, the device 120 checks the security data uploaded onto the consumable 110 to verify the consumable's 110 authenticity. Furthermore, secure elements in the consumable 110 and the device 120 can be mutually authenticated using asymmetric PKI based cryptography with unique per device or consumable secrets. The authorization token with time validity information can also be compared with the local secure time of the device 120. In addition, the CRL security data can be broadcasted from the consumable 110 and updated into the device 120, where in-turn, the device 120 can use the CRL to revoke suspicious consumables 110. Therefore, even if a subsequent consumable 110 is initially authenticated in S422, if it is blacklisted by the CRL, the authentication will fail and the consumable 110 will be denied some or all access to the device 120.

The next step S423 is determining whether the authentication performed in S422 was successful. If S422 was successful, the next step is S424; if not, the next step is S425.

In S424, prior to uploading, a secure channel is setup between the device 120 and the consumable 110 to securely exchange data. Then, the broadcast data and security data is uploaded from the consumable 110 onto the device 120. As an example, this can be a printer cartridge uploading a software update onto a printer. As another example, this can be a printer cartridge enabling (i.e. unlocking) a 600 dots per inch resolution printing feature on a printer.

S425 includes disabling one or more features of the device 120. This disabling disables the device 120 in some form, such as locking certain features of the device 120, degrading certain features of the device 120, uploading only a portion of the data, refusing to proceed, or requiring a manual override. The command to force the device 120 into a disabled mode can come from the consumable 110 or the device 120. In the case that the command comes from the consumable 110, this can be additional security data uploaded onto the device 120 from the consumable 110 after the authentication has failed. In the case that the command comes from the device 120, this can be the device 120 sending a control signal to disable one or more of its own features after the authentication has failed.

According to one embodiment, in a scenario where the consumable 110 is not successfully authenticated, the device 120 can disable usage of the consumable 110. For instance, a printer can disable usage of the particular ink cartridge (e.g. ink cartridge holding black ink) that was not successfully authenticated. According to another embodiment, in a scenario where the device 120 is not successfully authenticated, the consumable 110 can disable itself. For example, a battery can refuse to power a device, or an ink cartridge can refuse to receive device data uploaded by the device 120.

Figure 5:
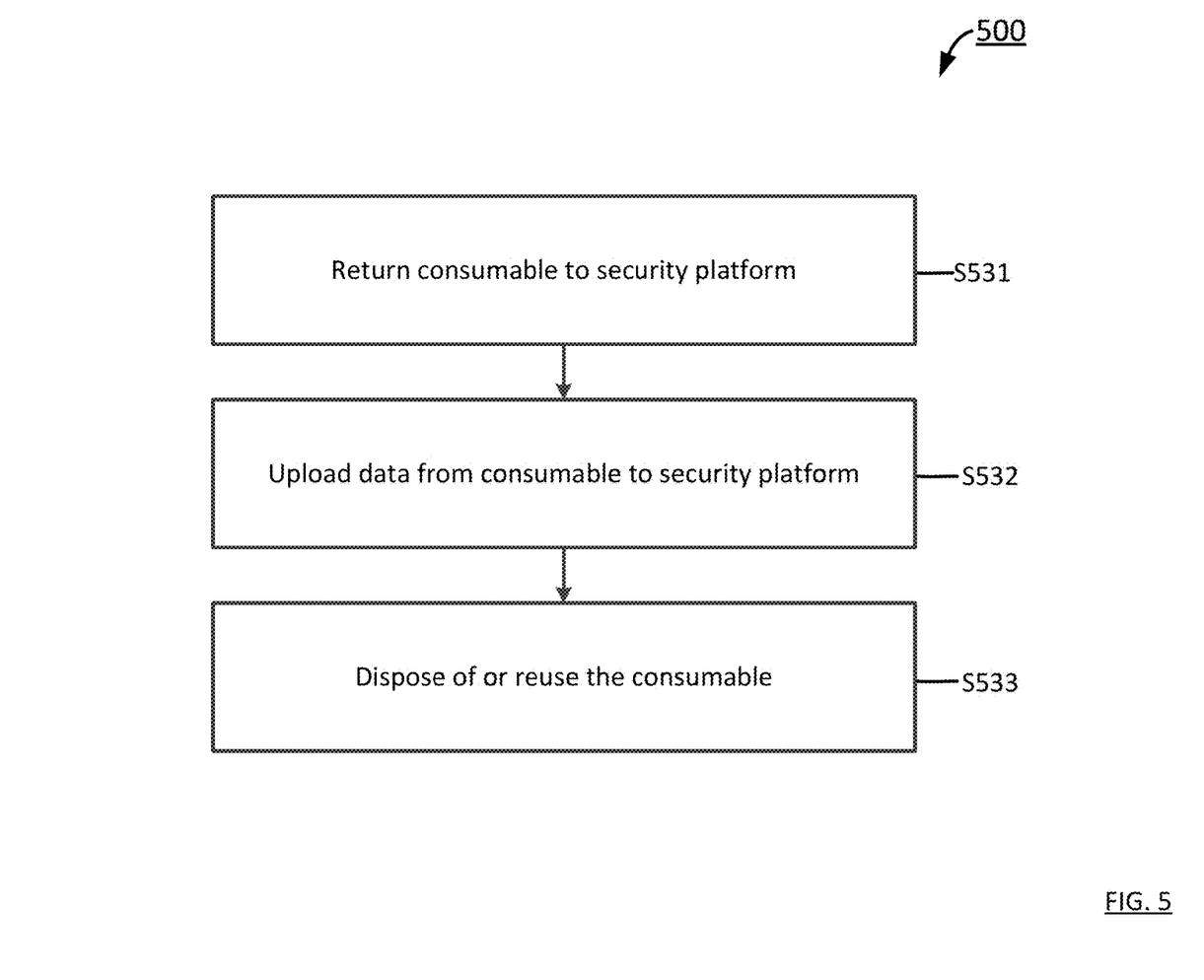
FIG. 5 is an algorithmic flowchart of returning a consumable for analysis by a security platform according to aspects of the present disclosure.

After performing S424 or S425, S426 is generating and storing device data from the device 120 onto the consumable 110. This can be data to be communicated between different devices 120 if the consumable 110 is going to be used for different devices 120. This can also be data related to monitoring data for security or predictive maintenance if the consumable 110 is to be returned to the security platform 100. Examples of device data can include consumable metadata, serial numbers, ordering info, and sub-contract certificates FIG. 5 is a method 500 for one embodiment of returning the consumable 110 as mentioned in S230. The first step S531 is returning the consumable to the security platform 100. For example, when an ink cartridge is out of ink, the owner can return it to an authorized supplier of that particular ink cartridge model.

The next step S532 is uploading device data from the consumable 110 to the security platform 100. The data for uploading can be that collected during S426 of method 400. The security platform 100 can be used for storing and processing the uploaded device data in S532. In one embodiment, this device data can be used for data driven decision making. For example, a supplier noticing that particular features of the device 120 are used more frequently than others can utilize that information to make more prudent business decisions.

S533 is to dispose of or reuse the consumable. In the case that the consumable is disposed of, it can be disposed of in a way such that confidential data cannot be obtained by unauthorized users. In the case that the consumable is reused, the consumable can be refilled and have new or additional data uploaded onto it using a similar technique to that described in method 300.

Figure 6:
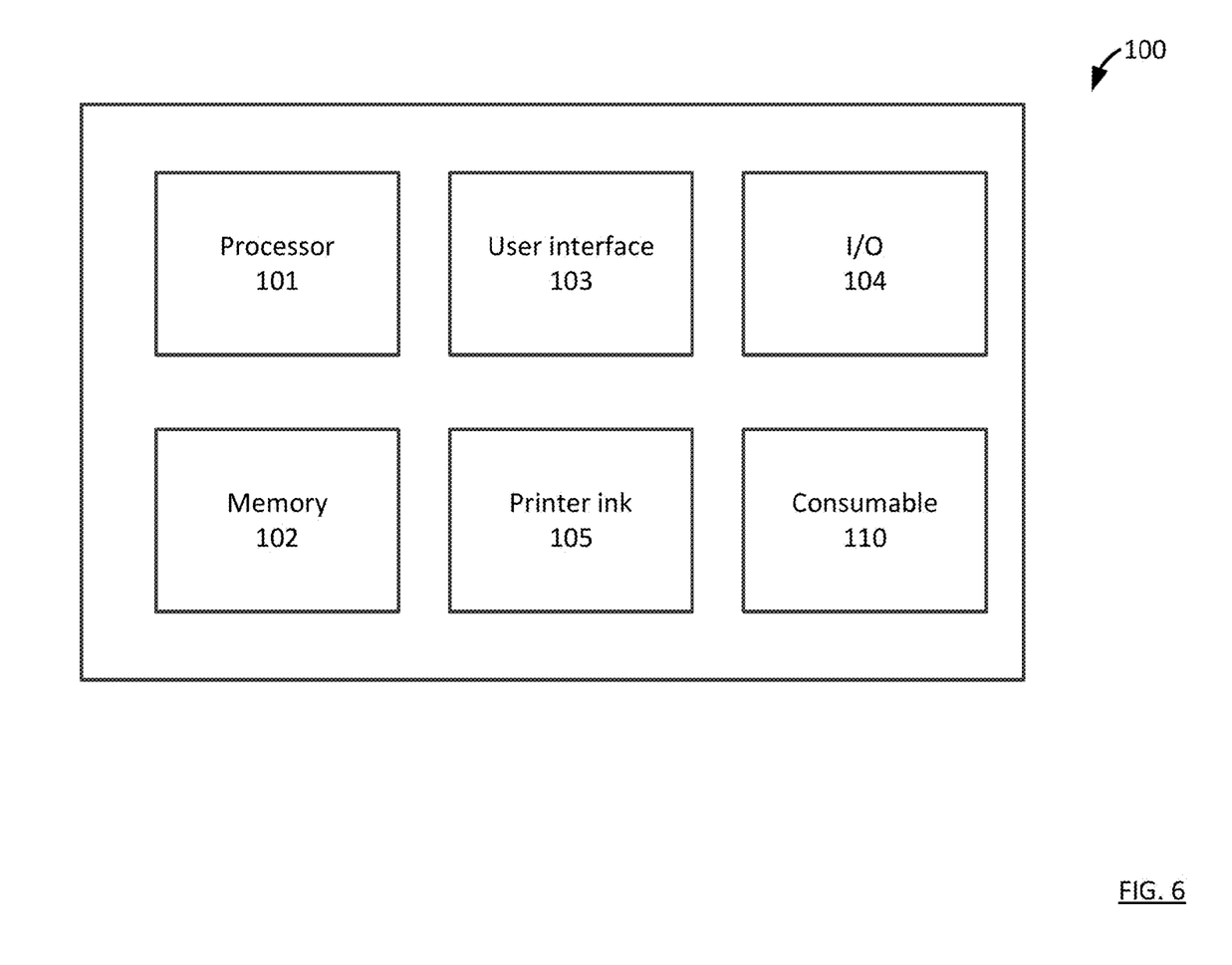
FIG. 6 is a hardware diagram of a security platform according to aspects of the present disclosure.

It can be appreciated that the above-mentioned methods can also be implemented as a system. FIG. 6 shows an example of a security platform 100. In one embodiment, the security platform 100 can be a self-serve booth where a user can obtain or return a consumable 110. The security platform 100 can include a processor 101, memory 102, user interface 103, input/output (I/O) 104, printer ink 105, and consumable 110.

The processor 101 may be based on a reduced instruction set (RISC) circuit architecture, Von Neumann architecture, Harvard architecture, or any other processing circuit architecture that is known. The processor 101 may also be implemented as a system on a chip, application specific integrated circuit (ASIC), field programmable gate array (FPGA), or with discrete logic circuit components. The processor 101 may also be implemented in software that is executed on processing circuitry having any of the architectures described above. The processor 101 can be embedded a secure element for communicating with the consumable 110. In one embodiment, the processor 101 can be configured to run all or portions of method 300 and/or 500.

The memory 102 can be used to store instructions and other data needed by the processor 101 in order to carry out various tasks in accordance with aspects of the present disclosure. The memory 102 may include permanent instructions that do not require changes, such as lower-level routines. The memory 102 may include a combination of random access memory and erasable programmable read only memory (EPROM) in order to store programming instructions that may be periodically updated and data that may change periodically or frequently during as the processor 101 executes instructions.

The user interface 103 can enable a user to interface with the security platform 100, for example, to obtain data parameters. In one embodiment, the user interface 103 can include interfaces for peripheral devices, such as a mouse, keyboard, speaker, memory stick, secure digital (SD) card, a liquid crystal display, et cetera.

The I/O 104 can include circuitry for delivering data between the security platform 100 and the consumable 110. The printer ink 105 can store printer ink for filling up the consumable 110.

Figure 7:
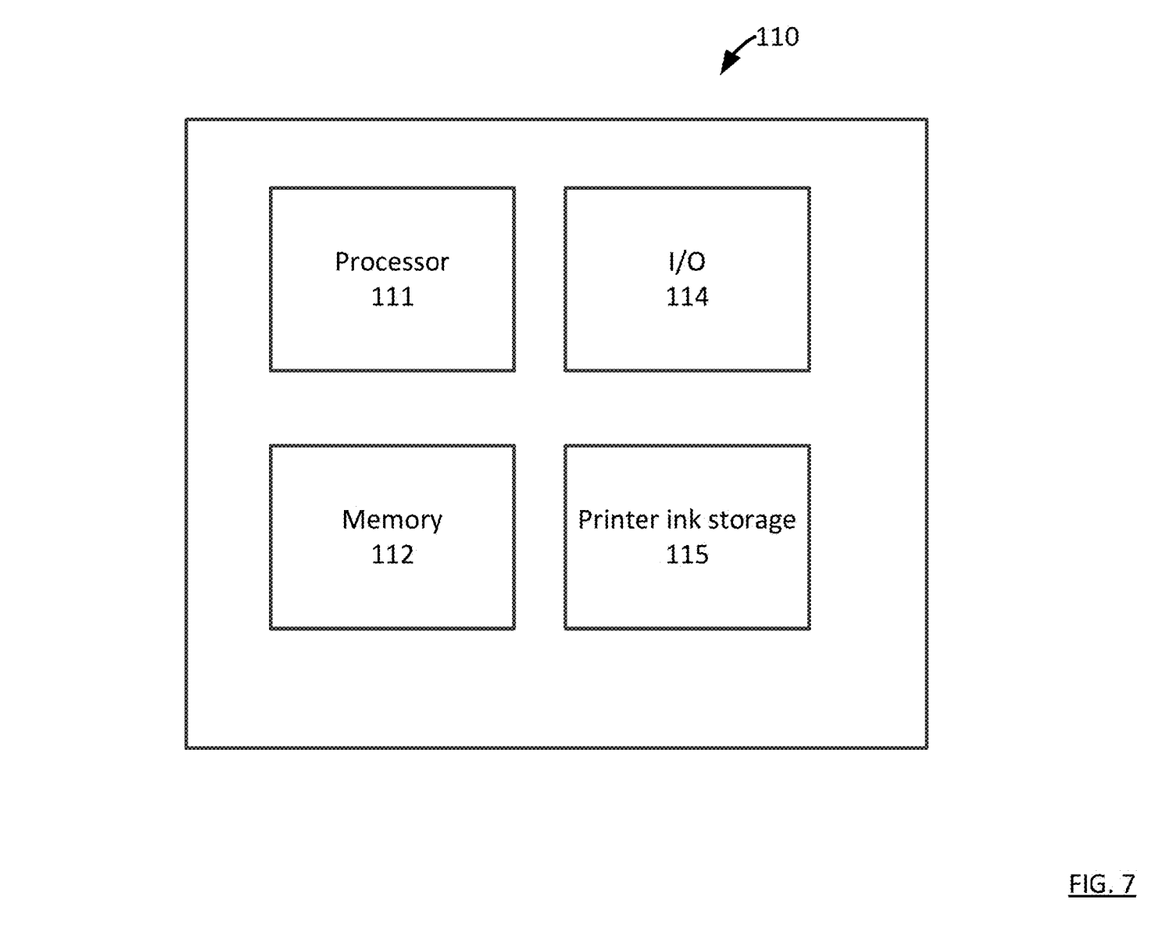
FIG. 7 is a hardware diagram of a consumable according to aspects of the present disclosure.

FIG. 7 shows an example of a consumable 110 represented as an ink cartridge. The consumable 110 can include a processor 111, memory 112, I/O 114, and printer ink storage 115.

The processor 111 may be based on a reduced instruction set (RISC) circuit architecture, Von Neumann architecture, Harvard architecture, or any other processing circuit architecture that is known. The processor 111 may also be implemented as a system on a chip, application specific integrated circuit (ASIC), field programmable gate array (FPGA), or with discrete logic circuit components. The processor 111 may also be implemented in software that is executed on processing circuitry having any of the architectures described above. The processor 111 can be embedded with a secure element for communicating with the device 120 and/or security platform 100. In one embodiment, the processor 111 can be configured to run all or portions of method 300, 400, and/or 500.

The memory 112 can be used to store instructions and other data needed by the processor 111 in order to carry out various tasks in accordance with aspects of the present disclosure. The memory 112 may include permanent instructions that do not require changes, such as lower-level routines. The memory 102 may include a combination of random access memory and erasable programmable read only memory (EPROM) in order to store programming instructions that may be periodically updated and data that may change periodically or frequently during as the processor 111 executes instructions.

The I/O 114 can include circuitry for delivering data between the security platform 100 and the consumable 110, as well as for delivering data between the device 120 and the consumable 110. The printer ink storage 115 can hold ink, which can be consumed by the device 120.

Figure 8:
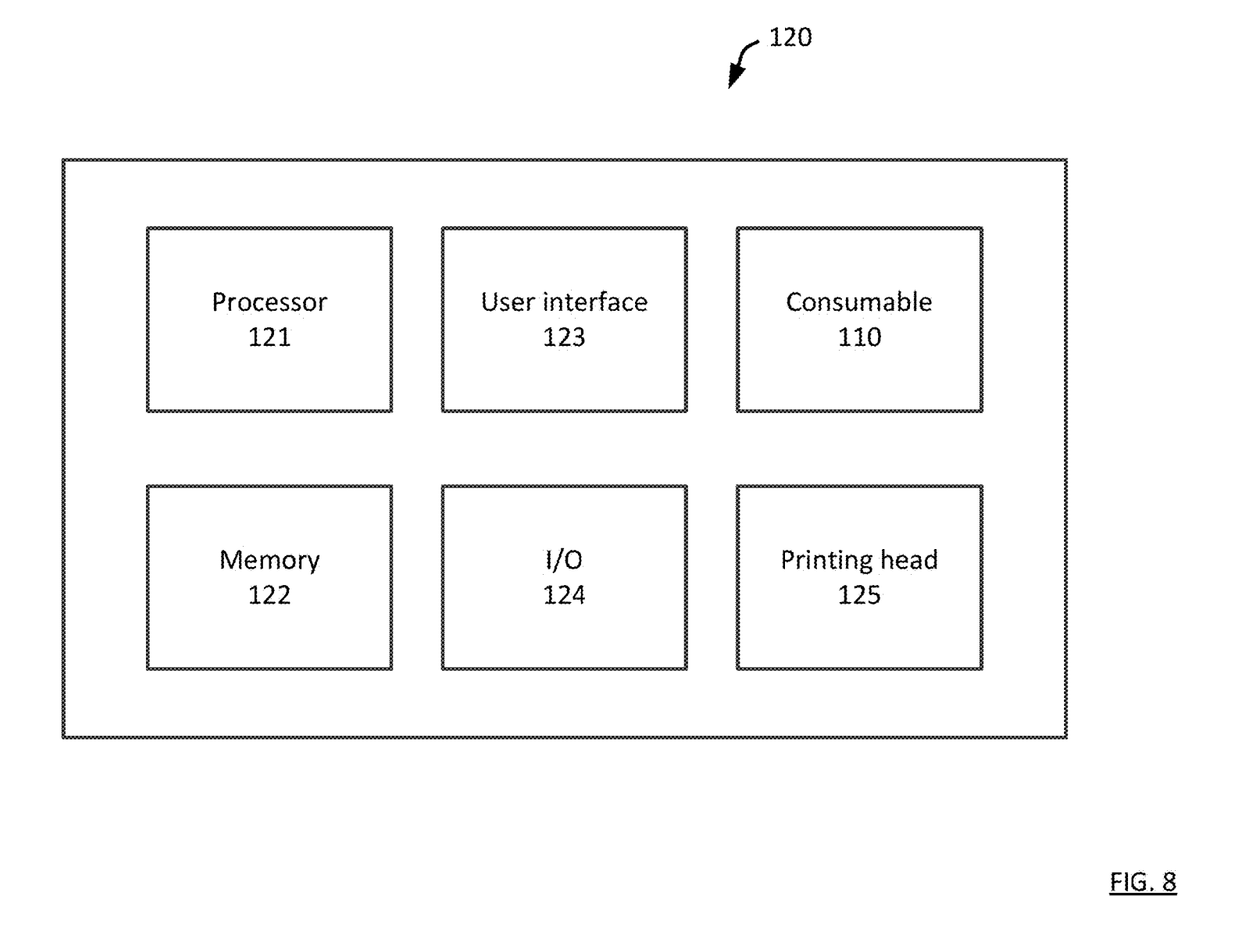
FIG. 8 is a hardware diagram of a device according to aspects of the present disclosure.

FIG. 8 shows an example of a device 120 represented as a printer. The device 120 can include a processor 121, memory 122, user interface 123, I/O 124, printing head 125, and consumable 110.

The processor 121 may be based on a reduced instruction set (RISC) circuit architecture, Von Neumann architecture, Harvard architecture, or any other processing circuit architecture that is known. The processor 121 may also be implemented as a system on a chip, application specific integrated circuit (ASIC), field programmable gate array (FPGA), or with discrete logic circuit components. The processor 121 may also be implemented in software that is executed on processing circuitry having any of the architectures described above. The processor 121 can be embedded with a secure element for communicating with the consumable 110. In one embodiment, the processor 121 can be configured to run all or portions of method 400.

The memory 122 can be used to store instructions and other data needed by the processor 121 in order to carry out various tasks in accordance with aspects of the present disclosure. The memory 122 may include permanent instructions that do not require changes, such as lower-level routines. The memory 122 may include a combination of random access memory and erasable programmable read only memory (EPROM) in order to store programming instructions that may be periodically updated and data that may change periodically or frequently during as the processor 121 executes instructions.

The user interface 123 can enable a user to interface with the device 120. In one embodiment, the user interface 123 can include interfaces for peripheral devices, such as a mouse, keyboard, speaker, memory stick, secure digital (SD) card, a liquid crystal display, et cetera.

The I/O 124 can include circuitry for delivering data between the consumable 110 and the device 120. The printing head 125 can use ink from the printer ink storage 115 in the consumable 110 to perform printing tasks. The printing head 125 can also include one or more motors for controlling the movement of the print head 125.

Figure 9:
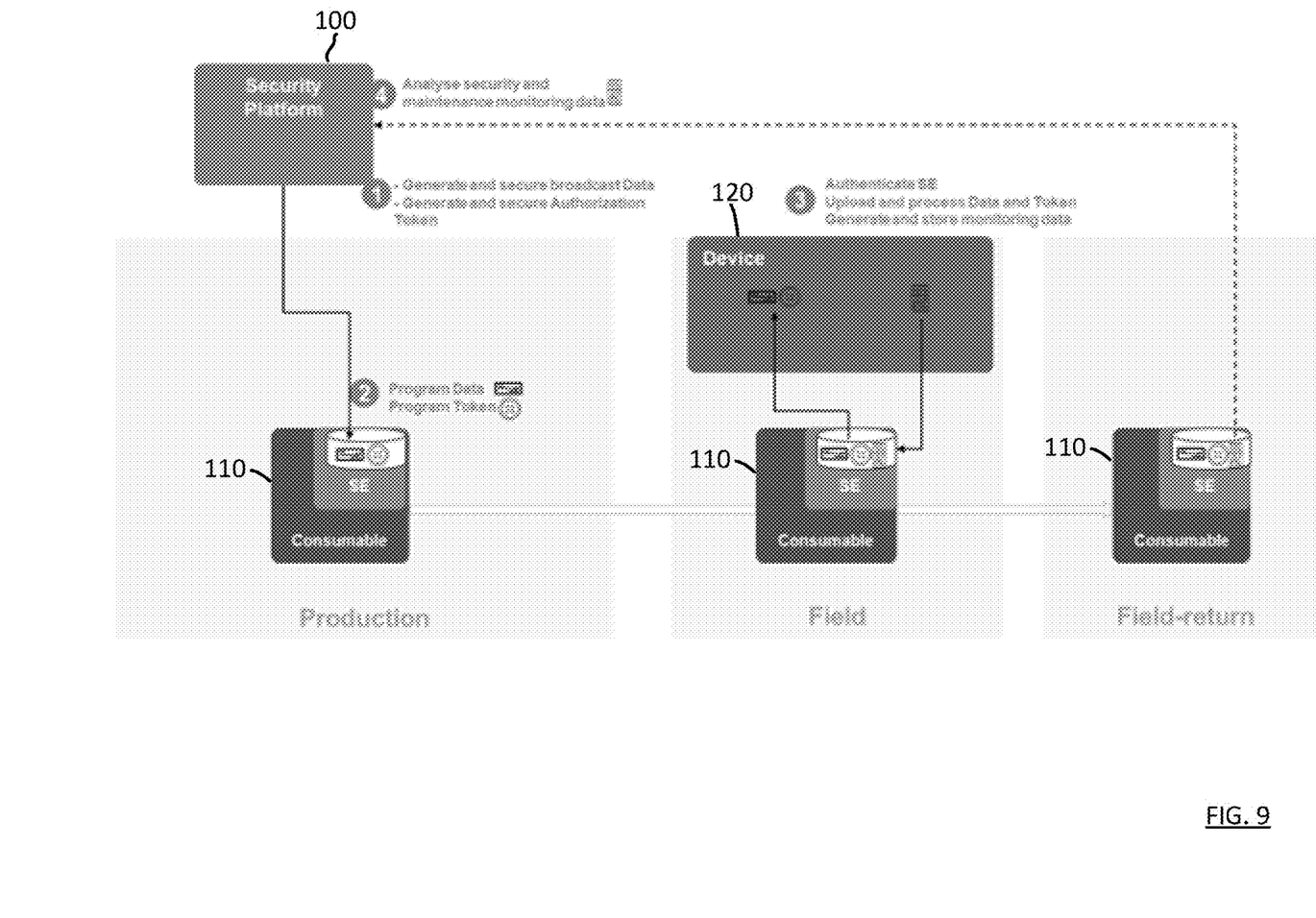
FIG. 9 is a workflow diagram of device communication via a consumable according to aspects of the present disclosure.

FIG. 9 is a workflow diagram according to one aspect. First, during production, the security platform 100 generates and secures broadcast data and an authorization token. Second, this broadcast data and authorization token are configured onto a secure element in the consumable 110. Third, a user takes this consumable 110 and communicatively couples it to a device 120. Once coupled, the secure element in the consumable 110 and a secure element in the device 120 are mutually authenticated in each other (e.g. anti-clone, consumption anti-replay, revocation list) using the authorization token to set up a secure channel for exchanging data between the consumable 110 and the device 120. The authorization token includes specific data to authorize usage of specific features of the device 120. If the mutual authentication is not successful, a secure channel is not set up, and the device 120 or consumable 110 will refuse to proceed or enter into a disabled mode. Moreover, the device 120 generates and stores its own data onto the secure element in the consumable 110. Fourth, the consumable 110 is returned to the security platform 100 for analysis of the data stored on the consumable 110.

As previously mentioned, one can appreciate that the techniques mentioned in this disclosure can be applied to a myriad of other systems. The techniques mentioned herein can solve problems related to performing authentications, identifying counterfeits, securely sending data via hardware, and licensing via hardware, all without needing a network connection. Additional examples of use cases can include: the device can be a shipping container and the consumable can be a temperature or humidity sensor; the device can be a vehicle (e.g. autonomous car, spaceship, boat) and the consumable can be a headlight or battery; the device can be medical equipment (e.g. PET scanner) and the consumable can be a flash drive; the device can be a headset or speakers, and the consumable can be a phone; the device can be a camera and the consumable can be an SD card or battery; the device can be an amplifier, and the consumable can be an instrument; the device can be a 3D printer, and the consumable can be filament; the device can be a display (e.g. TV), and the consumable can be a flash driver; the device can be a polaroid camera and the consumable can be polaroid film; the device can be a purifier (e.g. air, liquid) and the consumable can be a filter; the device can be a power tool (e.g. drill, angle grinder) and the consumable can be a battery.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

Embodiments of the present disclosure may also be as set forth in the following parentheticals.

(1) A method for securing a device comprising: loading, by a security system, data into a consumable, the data including security data and broadcast data; communicatively coupling the consumable to the device; performing an authentication between the consumable and the device using the security data in the consumable; and in a case that the authentication is successful, uploading the broadcast data from the consumable to the device.

(2) The method of (1) further comprising: in the case that the authentication is unsuccessful, disabling one or more features of at least one of the device and the consumable.

(3) The method of any (1) to (2) further comprising: uploading device data from the device to the consumable.

(4) The method of any (1) to (3), further comprising: directing the device, using the security data, to enable one or more features of the device.

(5) The method of any (1) to (4), further comprising: directing the device, using the security data, to disable one or more features of the device.

(6) The method of any (1) to (5), wherein the broadcast data includes software update data.

(7) The method of any (1) to (6), wherein the security data includes an authorization token.

(8) The method of any (1) to (7), wherein the consumable is a battery.

(9) The method of any (1) to (8), wherein the device is a printer.

(10) The method of (1) to (9), wherein the security data includes a consumable revocation list.

(11) A consumable device comprising: circuitry configured to, store data, the data including security data and broadcast data; perform an authentication between the consumable and a device using the security data in the consumable when the consumable and the device are communicatively coupled together; and in a case that the authentication is successful, upload the broadcast data from the consumable to the device.

(12) The device of (11), wherein the circuitry is further configured to, in the case that the authentication is unsuccessful, upload additional security data to the device to disable one or more features of the device.

(13) The device of any (11) to (12), wherein the circuitry is further configured to, receive device data from the device.

(14) The device of any (11) to (13), wherein the circuitry is further configured to, direct the device, using the security data, to enable one or more features of the device.

(15) The device of any (11) to (14), wherein the circuitry is further configured to, direct the device, using the security data, to disable one or more features of the device.

(16) The device of any (11) to (15), wherein the broadcast data includes software update data.

(17) The device of any (11) to (16), wherein the security data includes an authorization token.

(18) The device of any (11) to (17), wherein the consumable is a battery.

(19) The device of any (11) to (18), wherein the device is a printer.

(20) The device of any (11) to (19), wherein the security data includes a consumable revocation list.

What is claimed is:

1. A method for securing a printer, comprising:
generating a data item, the data item including security data and broadcast data, wherein the security data includes an authorization token and a cartridge revocation list, and the broadcast data includes at least one of a critical firmware fix, specific configuration data, or predictive maintenance data;
dividing the broadcast data into a first portion and a second portion;
loading, by a security system, the first portion into a first cartridge and the second portion into a second cartridge;
coupling the first and second cartridges to the printer;
performing an authentication between each of the first and second cartridges and the printer using security information included in the first and second cartridges; and
when the authentication is successful, uploading the first and second portions from the first and second cartridges, respectively, to the printer to provide an entirety of the broadcast data to the printer.

2. The method of claim 1 further comprising:
when the authentication is unsuccessful, disabling one or more features of at least one of the printer and the first and second cartridges.

3. The method of claim 1 further comprising:
uploading printer data from the printer to one of the first and second cartridges.

4. The method of claim 1, further comprising:
directing the printer, using the security data, to enable one or more features of the printer.

5. The method of claim 1, further comprising:
directing the printer, using the security data, to disable one or more features of the printer.

6. A cartridge device, comprising:
circuitry configured to
store, in a memory of the cartridge device, a first portion of broadcast data of a data item, the data item including security data and the broadcast data, wherein the security data includes an authorization token and a cartridge revocation list, and the broadcast data includes at least one of a critical firmware fix, specific configuration data, or predictive maintenance data;
perform an authentication between the cartridge device and a printer using security information included in the cartridge device when the cartridge device and the printer are coupled together; and
when the authentication is successful, upload the first portion of the data item from the cartridge device to the printer, wherein
a second portion of the broadcast data is included in another cartridge device communicatively coupled to the printer, and
the first and second portions stored in the cartridge device and the other cartridge device together form an entirety of the broadcast data to be uploaded to the printer.

7. The device of claim 6, wherein the circuitry is further configured to
   when the authentication is unsuccessful, upload additional security data to the printer to disable one or more features of the printer.

8. The device of claim 6, wherein the circuitry is further configured to receive printer data from the printer.

9. The device of claim 6, wherein the circuitry is further configured to direct the printer, using the security data, to enable one or more features of the printer.

10. The device of claim 6, wherein the circuitry is further configured to direct the printer, using the security data, to disable one or more features of the printer.

\* \* \* \* \*